May 24, 1932.  P. B. MOORE ET AL  1,860,198
AUTOMOBILE WINDSHIELD HINGE
Filed Aug. 16, 1929
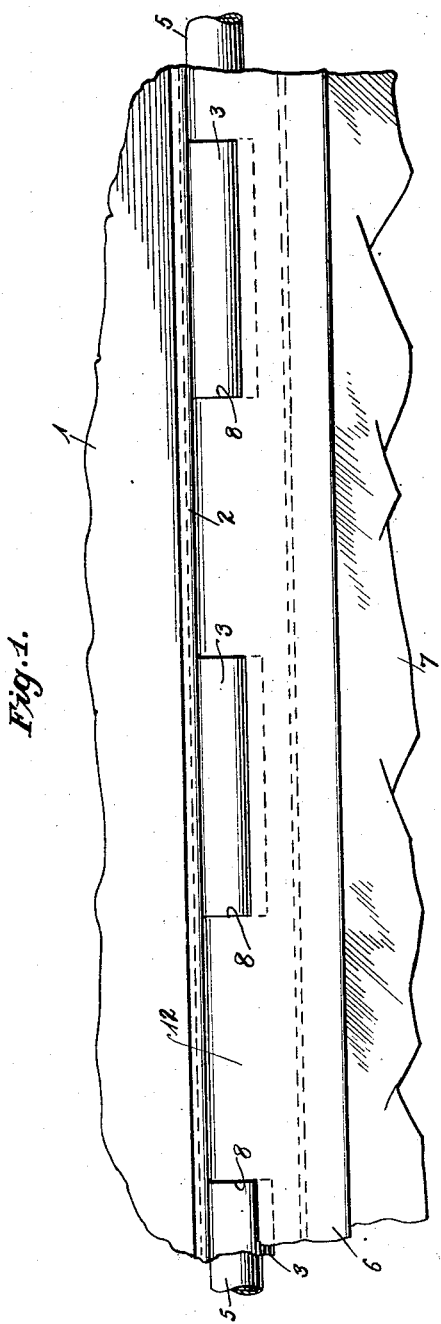
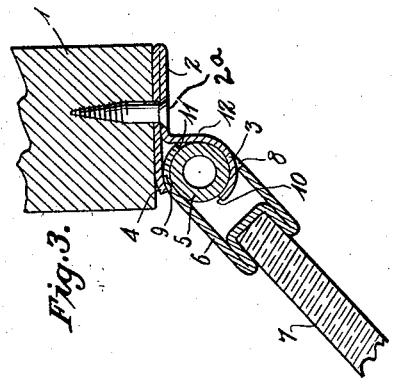
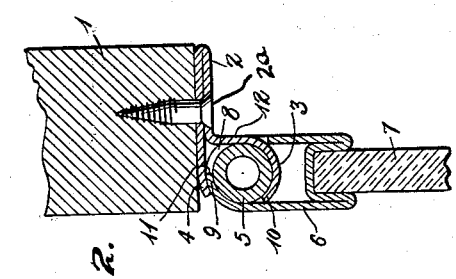
Inventors
Paul B. Moore
and Bennett Lewis
By Bacon & Thomas
Attorneys Patented May 24, 1932

1,860,198

UNITED STATES PATENT OFFICE

PAUL B. MOORE AND BENNETT LEWIS, OF INDIANAPOLIS, INDIANA, ASSIGNORS TO MARTIN-PARRY CORPORATION, OF YORK, PENNSYLVANIA, A CORPORATION OF DELAWARE

AUTOMOBILE WINDSHIELD HINGE

Application filed August 16, 1929. Serial No. 386,447.

This invention relates to automobile windshield hinges.

An object of the invention is to provide a construction of automobile hinge wherein the operating contacting parts are protected from rain, dirt, etc. and are in fact substantially weatherproof.

Another object of the invention is to provide a weatherproof hinge construction for windshields with means for definitely limiting the outward and inward swinging movements of the windshield section and the hinge part carried thereby.

Numerous other objects of the invention will be apparent to those skilled in the art from a reading of the following specification in conjunction with the drawings attached hereto and forming a part hereof, in which Figure 1 is a front elevation showing the hinge;

Figure 2 is a sectional view showing one position of the shield, while

Figure 3 is a similar sectional view showing another position thereof.

Referring now more specifically to the drawings, the reference numeral 1 indicates an automobile header of usual construction. 2 is an upper windshield hinge section folded upon itself and secured to the header by a fastening screw 2a or the like. This section is provided with spaced downwardly extending curved tongues 3 and an upper curved flange 4. The tongues 3 engage and support the pintle 5 as shown. The lower windshield section is preferably of channel shaped cross section as designated by reference numeral 6 with a curved base portion 9 and being recessed for receiving the edge of the windshield 7. At spaced longitudinal points of the lower section 6 I provide openings 8 formed in the base portion 9 and one side wall of said channel to receive the depending curved tongues 3 which extend into the confines of the channel section 6 and conform substantially to the curvature of the pintle 5. The curved portion 4 of the upper section is spaced from the pintle 5 as shown for receiving the curved portion 9 of the lower section 6. This provides an effective seal preventing the ingress of rain to the interior of the hinge.

As will be appreciated, the depending curved tongues 3 function, at two points or lines spaced around the periphery of the pintle, as stops to limit the inward and outward swinging movements of the lower section 6. Thus the terminal 10 of these tongues prevents an inward swinging movement of the lower section and the windshield supported thereby beyond a predetermined point because it contacts with the front side of the channel section 6. On the other hand, the outward swinging movement of the lower section 6 is definitely limited by engagement of the abutment 11 with the tongue at the portion 12 thereof. The exposed side of the hinge is by virtue of this arrangement substantially weatherproof and the parts are co-related and constructed in a manner to provide the stops as aforesaid. Moreover, the arrangement is an extremely simple one, inexpensive to manufacture and possesses the requisite durability for the automobile windshield hinge art.

Having thus described the invention, what we claim is:

1. A windshield hinge construction of the class described comprising an upper section folded intermediate its ends and secured to the automobile header, said section being formed at one side of the bight of the fold into a plurality of spaced depending tongues curved to open toward said header, a pintle mounted upon and supported by said tongues, a lower channeled hinge section provided with a plurality of openings in its wall for receiving said tongues and having a wall portion engaging the said pintle.

2. A windshield hinge construction of the class described comprising an upper section folded intermediate its ends and secured to the automobile header, said section having a plurality of spaced depending curved tongues, a pintle mounted upon and supported by said tongues, a lower hinge section of tubular form provided with a plurality of openings in one side wall for admitting said tongues and having a second portion engaging the upper part of said pintle, said curved tongues terminating in an abutment engaging the interior of the opposite side wall of the lower section to limit the inward swinging movement thereof.

3. A windshield hinge of the character described comprising upper and lower sections, said upper section being bent upon itself and provided with a plurality of longitudinally spaced curved tongues, a windshield pintle, a longitudinally disposed curved flange formed on said section, the curvatures of the tongues and flange being in opposite directions to receive said pintle, a lower movable section of tubular formation being provided with a plurality of openings in its wall for receiving said supporting tongues and having an upper curved portion extending between the pintle and said curved flange whereby to protect the pintle from weather, said curved portion of the lower section being provided with an abutment engaging the inner surface of the tongue to limit the outward swinging movement of the lower section.

4. An automobile windshield hinge construction of the character described comprising an upper section folded upon itself and secured to an automobile header and having its ends flared in opposite directions to provide a space for receiving a pintle therebetween, a lower tubular section having an upper curved wall portion for extending between the pintle and the upper fold of the upper section to provide a weatherproof joint, means for limiting the inward swinging movement of the lower section and means for limiting the outward swinging movement of said section.

5. An automobile hinge of the character described comprising an upper section provided with a plurality of depending supporting tongues for receiving and supporting a longitudinally disposed pintle, a lower section of tubular formation having spaced openings in its wall for admitting the curved tongues within the confines thereof, said lower section being movable relative to the upper section and having a curved upper portion engaging the upper surface of the pintle and supported thereby, said curved supporting tongues being provided with terminal portions adapted to limit the inward swinging movement of said curved section.

6. In combination, a tubular windshield frame member having a channeled longitudinal edge portion to receive a windshield glass and a transversely curved longitudinal edge portion which is adapted to movably engage a hinge pintle positioned within the frame member and having a plurality of spaced openings, and a hinge member secured to a header and having a plurality of curved tongues entering the frame member through said openings and supporting said pintle.

In testimony whereof we affix our signatures.

PAUL B. MOORE.
BENNETT LEWIS.